United States Patent
Mikami

(10) Patent No.: US 7,096,018 B2
(45) Date of Patent: Aug. 22, 2006

(54) GROUP COMMUNICATION SYSTEM HAVING GROUP NUMBER SPECIFIED BY MOBILE UNIT TO PERMIT INTERGROUP CALLS

(75) Inventor: Hiroshi Mikami, Tokyo (JP)

(73) Assignee: NEC Corporation, Tokyo (JP)

(*) Notice: Subject to any disclaimer, the term of this patent is extended or adjusted under 35 U.S.C. 154(b) by 518 days.

(21) Appl. No.: 10/628,958

(22) Filed: Jul. 28, 2003

(65) Prior Publication Data

US 2004/0028019 A1 Feb. 12, 2004

Related U.S. Application Data

(63) Continuation of application No. 08/924,655, filed on Sep. 5, 1997, now abandoned.

(30) Foreign Application Priority Data

Sep. 6, 1996 (JP) .............................. 1996/236088

(51) Int. Cl.
*H04Q 7/20* (2006.01)
(52) U.S. Cl. .................. 455/435.1; 455/433; 455/518; 455/416; 455/436
(58) Field of Classification Search ................ 455/517, 455/518, 519, 520, 435.1, 432.1, 433, 416
See application file for complete search history.

(56) References Cited

U.S. PATENT DOCUMENTS

| | | | |
|---|---|---|---|
| 4,718,108 A | 1/1988 | Davidson et al. | |
| 4,972,460 A | 11/1990 | Sasuta | |
| 5,408,515 A | 4/1995 | Bhagat et al. | |
| 5,465,391 A | 11/1995 | Toyryla | |
| 5,473,605 A | 12/1995 | Grube et al. | |
| 5,490,203 A | 2/1996 | Jain et al. | |
| 5,519,761 A | 5/1996 | Gilhousen | |
| 5,559,865 A | 9/1996 | Gilhousen | |
| 5,583,852 A | 12/1996 | Ikeda et al. | |
| 5,603,080 A | 2/1997 | Kallander et al. | |
| 5,724,648 A | 3/1998 | Shaughnessy et al. | |
| 5,797,100 A | 8/1998 | Dettner | |
| 5,809,018 A | 9/1998 | Lehmusto | |
| 5,835,860 A | 11/1998 | Diachina | |
| 5,842,136 A | 11/1998 | Tuulos | |
| 5,873,023 A | 2/1999 | Phillips et al. | |
| 5,924,033 A | 7/1999 | Carlsson et al. | |
| 5,924,042 A * | 7/1999 | Sakamoto et al. | ... 455/435.1 X |
| 5,930,723 A | 7/1999 | Helskari et al. | |

(Continued)

FOREIGN PATENT DOCUMENTS

JP 2-119326 A1 5/1990

*Primary Examiner*—Matthew Anderson
*Assistant Examiner*—Philip J. Sobutka
(74) *Attorney, Agent, or Firm*—Foley & Lardner LLP

(57) ABSTRACT

In a group communication system, a mobile station that is not currently under a group communication can participate in a group communication. A location registration signal is transmitted to a base station upon turning on the power of a mobile station or when a mobile station moves between communication zones A group communication number is sent from the mobile station and is examined against a group-communication group number controlling register in a control station The examination determines the presence or absence of a group communication call corresponding to the group-communication number sent by the mobile station Notification information on a relevant call, if present, is sent to the mobile station, which can then participate in the group communication.

28 Claims, 5 Drawing Sheets

U.S. PATENT DOCUMENTS

| | | |
|---|---|---|
| 5,933,780 A | 8/1999 | Connor et al. |
| 5,956,639 A | 9/1999 | Armbruster et al. |
| 5,970,408 A | 10/1999 | Carlsson et al. |
| 5,970,417 A | 10/1999 | Toyryla et al. |
| 5,995,833 A | 11/1999 | Zicker |
| 5,999,520 A | 12/1999 | Little |
| 6,039,624 A | 3/2000 | Holmes |
| 6,055,425 A | 4/2000 | Sinivaara |

* cited by examiner

GROUP COMMUNICATION SYSTEM HAVING GROUP NUMBER SPECIFIED BY MOBILE UNIT TO PERMIT INTERGROUP CALLS

This application is a continuation of application Ser. No. 08/924,655 filed Sep. 5, 1997, now abandoned.

BACKGROUND OF THE INVENTION

1. Field of the Invention

This invention relates to a group communication system as a multi-channel access type of mobile communications.

2. Related Art

There has been disclosed a group communicating system in a mobile communication system adopting a conventional multi-channel access as described in Japanese Patent Kokai Publication NOS. JP-A-H2-119326 and JP-A-H2-119327. According to these systems, speech channel designation control is carried out within a single wireless communication zone (referred to as "wireless zone") to make possible group communications between mobile units existing within the same wireless zone. It has however been impossible to implement speech channel communication control over a plurality of wireless zones, and accordingly the group communication across a plurality of wireless zones was impossible.

Also conventionally, in order for a mobile station to participate in a group communication, the mobile station has to be powered on beforehand to be put into a receivable state in advance of performing the group communication.

Further in the case where a mobile station participating in a communication in a group-nonobjective wireless zone enters, due to hand-over or the like, a group-objective wireless zone, the mobile station could not take part in a group communication.

SUMMARY OF THE DISCLOSURE

In the conventional group communication system the participation in a group communication is possible only in the case where the mobile station has completed a location registration operation at the beginning of a group communication. Consequently, there has been a problem that a mobile station cannot participate in a group communication if the mobile station belonging to the group communication has not been powered on, i.e., its location registration operation has-not been executed.

For the mobile station participating in a communication in this manner outside the group-communication objective wireless zone, at the station of beginning the group communication, location registration operation for the group-communication objective wireless zone so that this method does not allow participation in a group communication. Therefore, there has also been a problem that in case where a mobile station is under communication over a plurality of zones (service areas) it cannot participate in group communication upon entering a group objective wireless zone due to hand-over, even if it possesses a group communication number.

It is therefore an object of the present invention to provide a group communication system in which a mobile station which is presently not participating in a group communication, can take part in the group communication.

Further objects will become apparent in the entire disclosure.

According to one aspect of the present invention there is provided a group communication system comprising one or a plurality of control stations, one or a plurality of base stations connected to the control station via a wire line or a wireless line, and a plurality of mobile stations connected to the base stations via wireless lines. The group communication system provides the control station or the base station with a function of controlling a group communication number which is under communication via any of the base and control stations, and the mobile station with a function of transmitting a group communication number together with a conventional mobile station identification number upon operation of location registration of the mobile station due to turning on of power, hand-over, or the like. The control station or the base station that has received a group communication number transmitted together with a location registration signal from the mobile station examines the presence or absence of a call during communication based on the group communication number, with the information thereof being notified to the mobile station when a relevant call is present, so that the mobile station receiving the notification participates in the group communication through a calling procedure based on the group number, automatically or through operation by a user (or subscriber) of the mobile station.

Particularly, there is provided with a group communication system wherein (a) the control station or the base station comprises means for controlling a group communication number which is under communication via any of said base and control stations and (b) the mobile station comprises means for transmitting a group communication number together with a conventional mobile station identification number upon operation of location registration of the mobile station.

On the other hand the control station or the base station receives a group communication number transmitted together with a location registration signal from the mobile station, and the control station or the base station comprises means for examining the presence or absence of a call during communication based on the group communication numbers, with the information thereof being notified to the mobile station, when a relevant call is present so that the mobile station receiving the notification is allowed to participate in the group communication through a calling procedure based on the group number, automatically or through operation by a user (or subscriber) of the mobile station.

Also, according to another aspect of the present invention, there is provided a group communication system wherein there is means for providing a group communication number for a mobile station to an information element of a location registration signal transmitted to a base station, when power of a mobile station is turned on or when a mobile station in communication over a plurality of zones entered into a group-communication objective wireless zone due to hand-over or else. Also there is means for retrieving the group communication number by a group-communication group number controlling register in a control station, examining the presence or absence of a group communication call of the mobile station, and upon a relevant call being present, notifying the information about the relevant call to the mobile station so the mobile station may participate in the group communication.

A group-communication group number controlling register existing in the control station or the base station carries out control of calls during a group communication so as to be referenced with a group communication signal of the information element of the location registration signal transmitted from the mobile station. Consequently, where a call of the group communication is present, it is possible to notify information thereof to the mobile station. Therefore, the mobile station has a function of participating in a group communication automatically or through a calling procedure by an operation of a subscriber of the mobile station.

According to the present invention, a group-communication-objective mobile station, that has hitherto not been allowed to participate in a group communication at the beginning of telephone calling, can participate in telephone communication at the time an operation of location registration is executed.

PREFERRED EMBODIMENTS OF THE INVENTION

Figure 1:
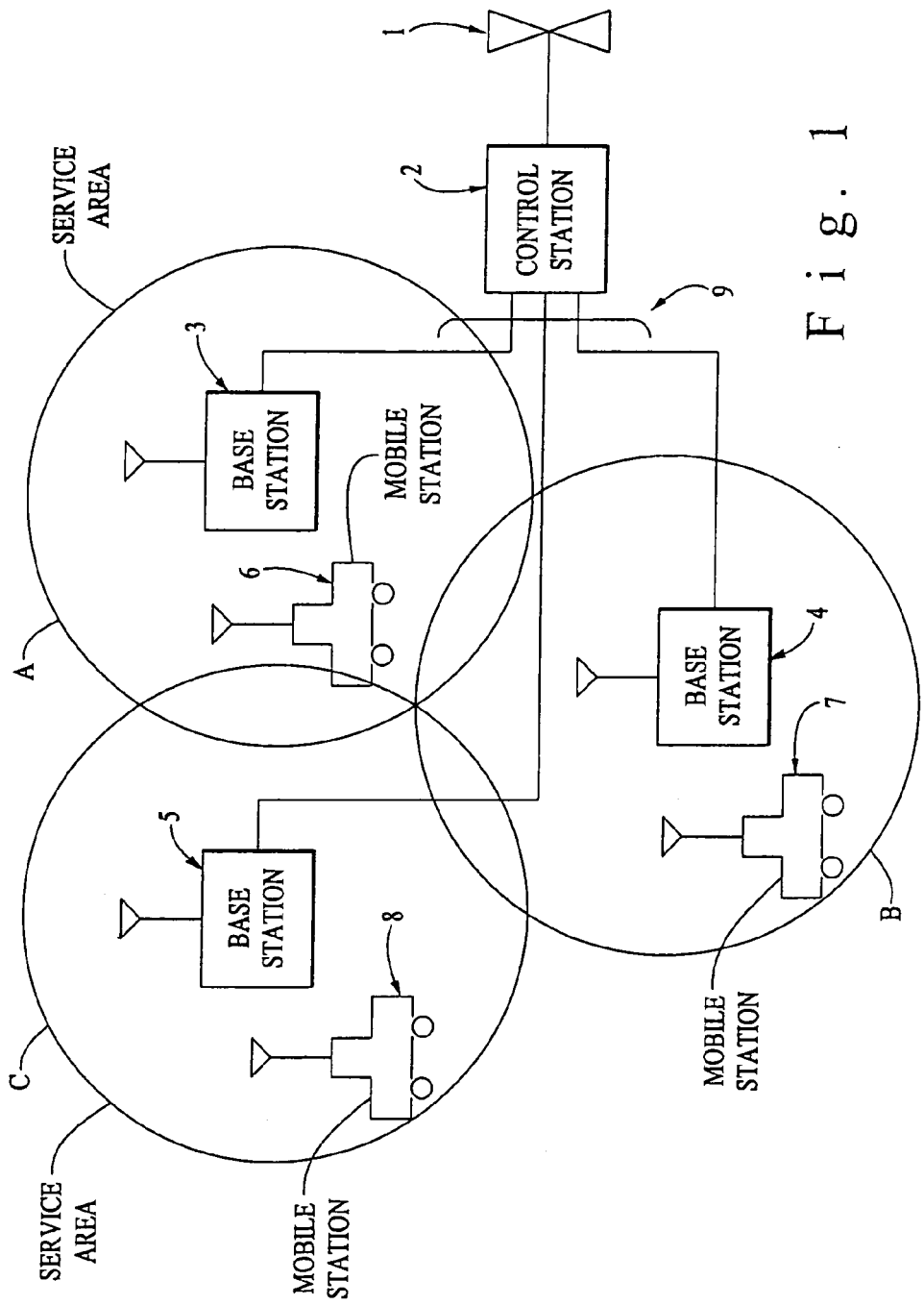
FIG. 1 is a system diagram of a group communicating system according to an embodiment of the present invention.

An embodiment of the preset invention will be explained with reference to the drawings. FIG. 1 is a system diagram of an embodiment of the present invention. A control station 2 is connected through link lines 9 to base stations 3, 4, 5 for respective service areas A, B, C. Also, the control station 2 is connected with a telephone 1. Further, mobile stations 6, 7, 8 are connected through wireless link to the base stations 3, 4, 5 in the respective service areas A, B, C.

Figure 2:
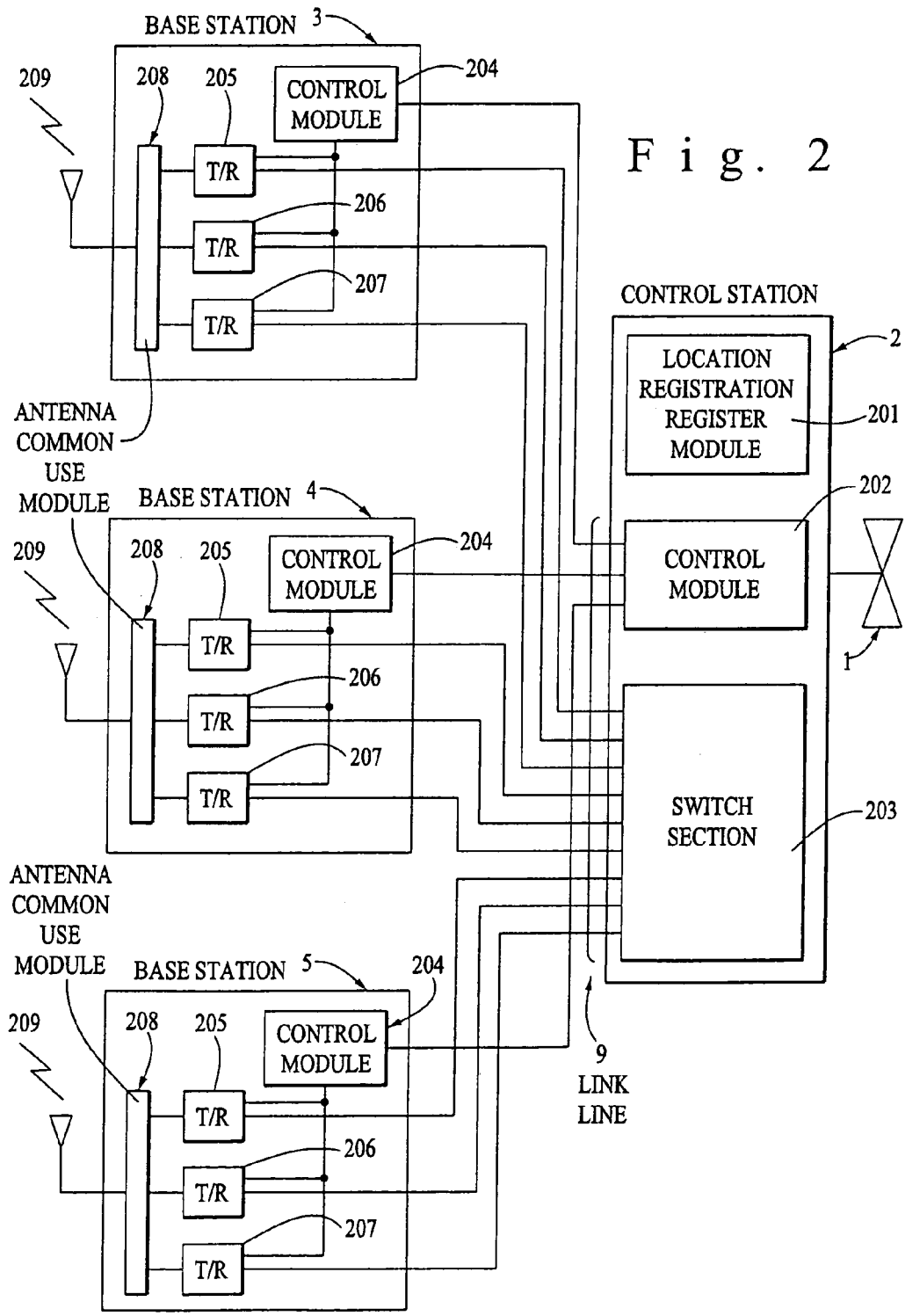
FIG. 2 is a block diagram of a base station and a control station.

FIG. 2 is a block diagram of the control station 2 and the base stations 3, 4, 5. The control station 2 has a control module 202 connected to a location registration register module 201 and a switch section 203 in a control module. The control module 202 is connected with control modules 204 in each base station through a link line 9, to carry out control for each base station and provides various controls to a mobile station via a control channel transmitter/receiver 205 in the base station. The switch module 203 serves to constitute a communication line between the mobile station and the telephone 1 via a transmitting/receiving module 206, 207 of any of the base stations connected through the link line 9, or constitute a communication line between the mobile station and another mobile station through another transmitting/receiving module. The location registration register module 201 performs confirmation whether the mobile station has been registered by this system, when power of the mobile station turns on or the mobile station is registered as a location registration signal at the location registration register module 201 upon hand-over or the like. On the other hand, the communicating information proper to the mobile station is retrieved in the location registration register module 201. An antenna common-use module 208 is provided for common use of an antenna 209 by a plurality of transmitting/receiving modules.

Figure 3:
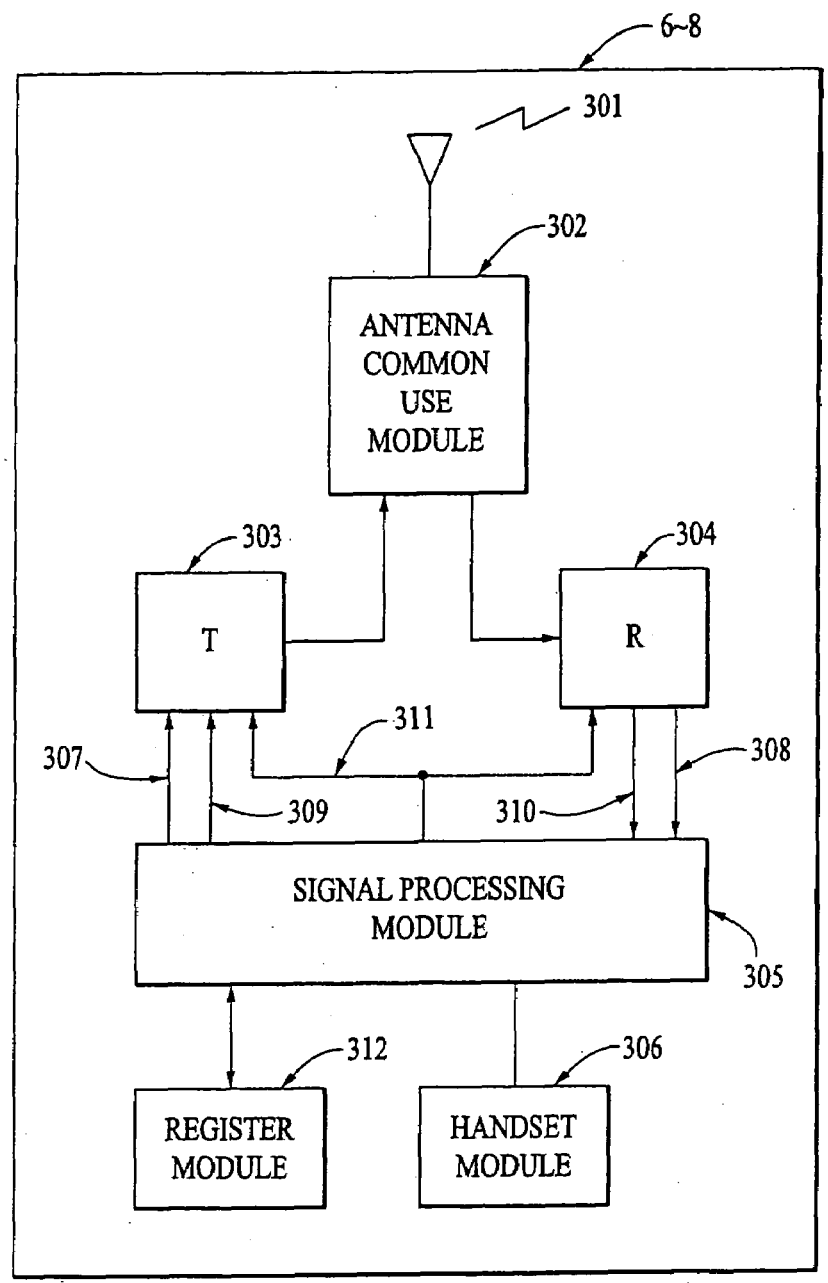
FIG. 3 is a block diagram of a mobile station.

FIG. 3 is a block diagram of the mobile station 6, 7, 8. In each mobile station 6, 7, 8, a transmitting module 303 and a receiving module 304 is connected through an antenna common-use module 302 to an antenna 301. Also, the transmitting module 303 and the receiving module 304 are connected to a signal processing module 305, and further connected to a register module 312 and a hand-set module 306. The signal processing module 305 and the transmitting module 303 are connected by a modulation signal line 307 and a transmission starting line 309, and the signal processing module 305 and the receiving module 304 are connected by a demodulation signal line 308 and an electric-field information line 310. Further, the transmitting module 303 and the receiving module 304 are connected by a channel designation line 311.

A register module 312 stores communication control information such as a mobile-station identification number proper to any of the mobile stations and group communication numbers.

Figure 4:
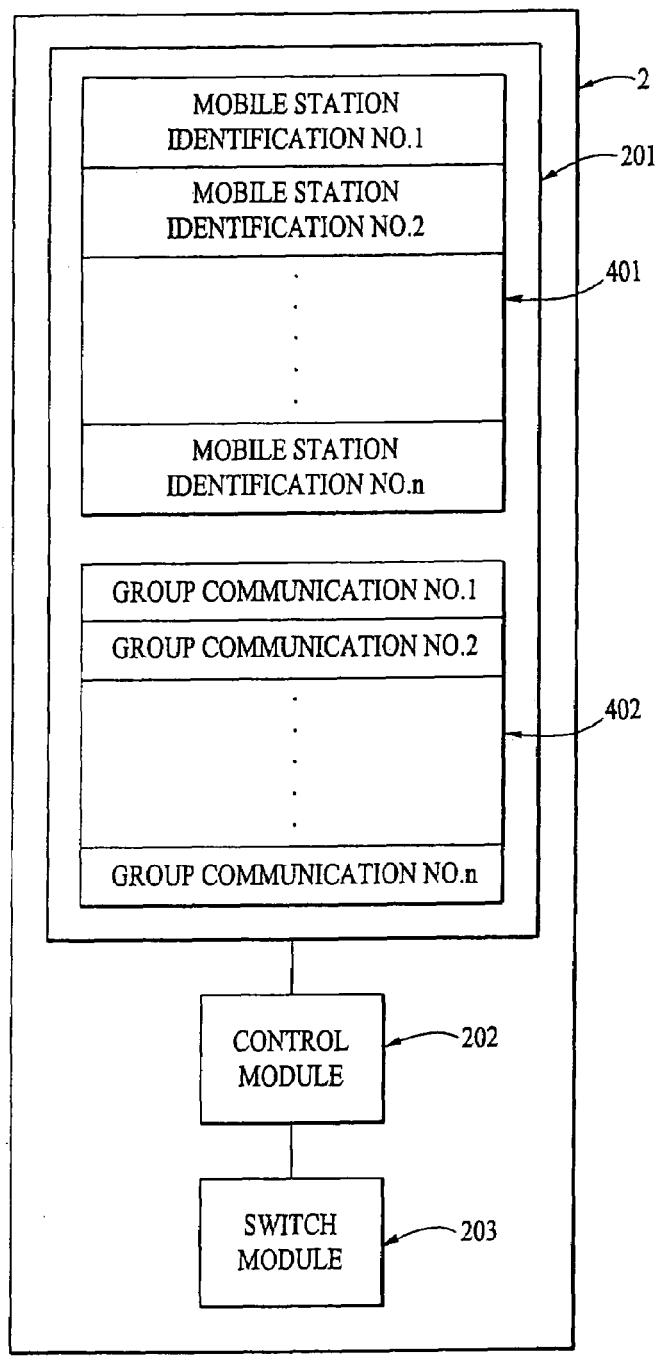
FIG. 4 is a block diagram of a control module, a switch section, and a location registration register module in the control station.

FIG. 4 is the location registration register module 201, the control module 202 and the switch module 203 provided in the control station or the base station. The location registration register module 201 is formed by a mobile-station identification number controlling register module 401 and a group-communication mobile station group number controlling register 402. The mobile-station number controlling register module 401 has a function to perform confirmation of whether or not a location registration signal transmitted upon call-out operation of the mobile station is of a mobile station that has been registered in the present system, by retrieving a mobile station identification number stored in the mobile station controlling register 401. The result is notified to the mobile station.

Further, the group-communication mobile station group number controlling register module 402 has a function, upon receiving a group communication number from the mobile station, to confirm the presence or absence of a group communication calling belonging to the mobile station by means of the group communication number of the same mobile station that has been registered beforehand. If there is a call relevant thereto, the information thereof is notified to the mobile station.

Figure 5:
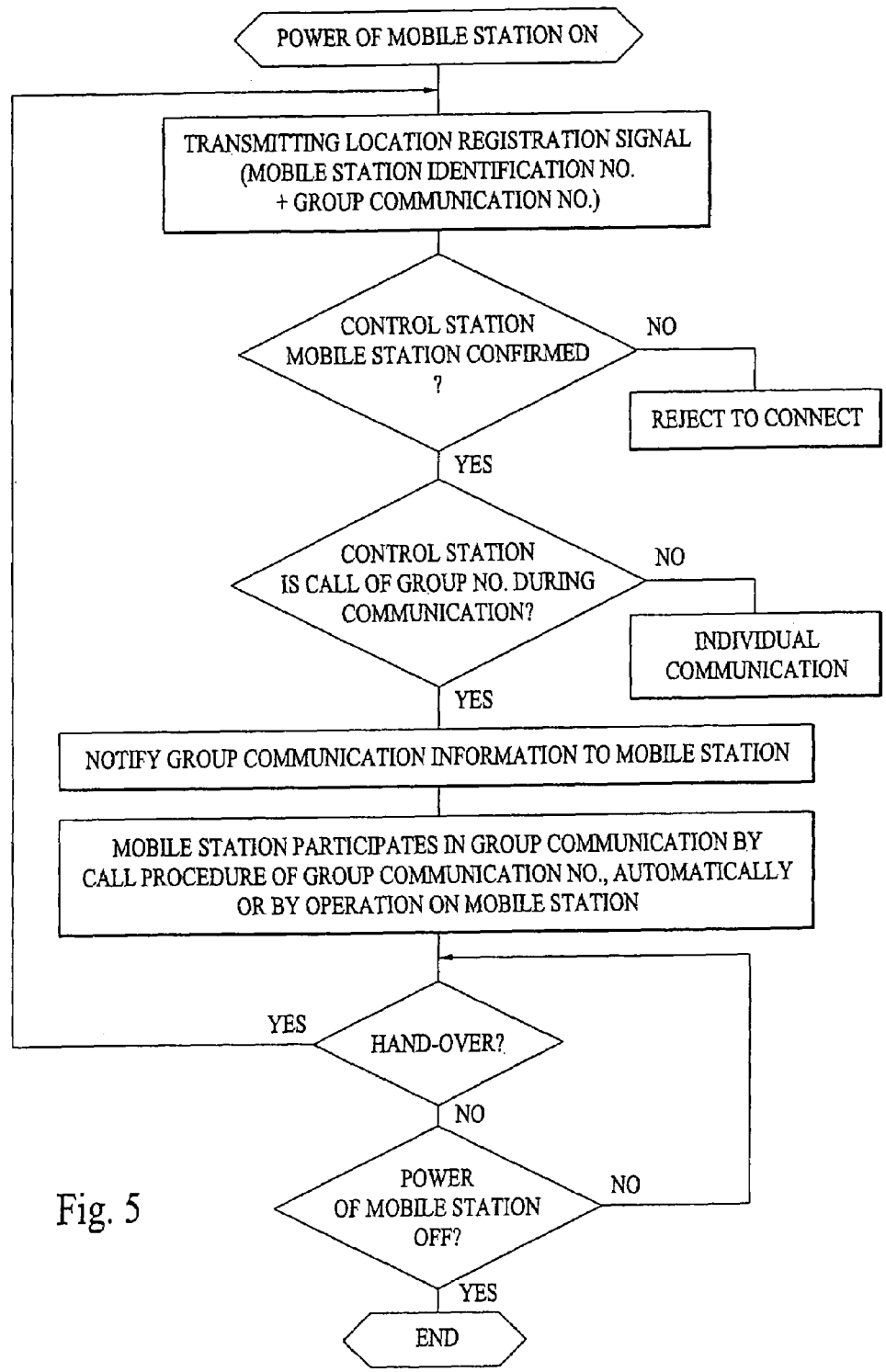
FIG. 5 is a flowchart for explaining an operational example of the control module.

FIG. 5 is a flowchart for explaining the operational example of the embodiment of the present invention.

The location registration signal transmitted when power of the mobile station is turned on, the mobile station is subjected to confirmation on the mobile station number by the mobile station identification number controlling register 401, through the control-channel transmitting/receiving module 205, the link line 9, and the control module 202 of the control station 2. Further, the presence or absence of a group communication calling is confirmed by the group-communication mobile station group number controlling register 402. If there is a call relevant thereto, the information thereof is notified to the same mobile station through the control station 202, the link line 9, and the control-channel transmitting/receiving module 205 of the base station.

The mobile station notified is enabled, automatically or through an operation by the subscriber to the mobile station, to participate in the group communication through a call-out procedure with the group communication number in the course of the telephone calling.

Also, where the mobile station enters a group-communication-objective wireless zone due to hand-over to another zone or the like, the mobile station possessing the group communication number can take part in a group communication, in the course of the telephone calling, by transmitting the location registration number in the same manner as in the location registration signal transmitted when power is turn on at the mobile station turns on power.

It should be noted that modifications obvious in the art may be done without departing the gist and scope of the present invention as described herein and claimed as appended.

What is claimed is:

1. A group communication systems comprising:
   one or more control stations;
   one or more base stations connected to the control station via a wire line or a wireless line; and
   a plurality of mobile stations connected to the base stations via wireless lines,
   wherein the control station or the base station comprises means for controlling a group communication number which is under communication via any of said base and control stations, the group communication number being an identification number for a group communication made up of a group of mobile stations from among said plurality of mobile stations, and
   the mobile station comprises means for transmitting a group communication number together with a mobile station identification number upon executing location registration of the mobile station, and
   wherein in response to receiving a group communication number transmitted together with a location registration signal from the mobile station, said control station or said base station comprises means for examining the presence or absence of a call based on the group communication number and a group number controlling register that identifies which group communication calls are active, the mobile station being notified when a relevant group communication call is present so that the mobile station receiving the notification is allowed to participate in the group communication through a calling procedure based on the group number, automatically or through operation by a user of the mobile station.

2. The group communication system as defined in claim 1, wherein said control station comprises said means for controlling the group communication number which is under communication.

3. The group communication system as defined in claim 1, wherein said base station comprises said means for controlling the group communication number which is under communication.

4. The group communication system as defined in claim 1, wherein said control station or said base station comprises a location registration register module, a control module, and a switch module, with said location registration register module comprising a mobile station identification number register module and said group number controlling register module.

5. The group communication system as defined in claim 4, wherein said control module is operatively connected with a control module at each of said base stations.

6. The group communication system as defined in claim 5, wherein said mobile station comprises a signal processing module connected to a register module which stores communication control information including the mobile station identification number and the group communication number, said signal processing module being programmed to transmit the stored mobile station identification number and the stored group communication number to the base station, automatically through a programmed procedure or through manual operation on the mobile station.

7. The group communication system as defined in claim 6, wherein said control module comprises a programmed step which confirms the mobile station through its identification number and a current location registration signal upon power ON of the mobile station followed by examining if there is a call for the group communication number, and if confirmed, notifies the group communication information to the mobile station.

8. The group communication system as defined in claim 7, wherein said control module further checks if hand-over into a new service area occurred for the mobile station, and if YES, said programmed step is repeated under a new location registration signal indicative of the new service area.

9. A control station in a group communication system, comprising:
   means for receiving a location registration signal including a group communication number from a mobile station among a plurality of mobile stations when power of the mobile station is turned on or when the mobile station in communication over a plurality of zones enters a group-communication objective wireless zone due to hand-over, the group communication number being an identification number for a group communication made up of a group of mobile stations from among said plurality of mobile stations;
   means for examining presence or absence of a group communication call of the mobile station based on the group communication number received from the mobile station and a group number controlling register that identifies which group communication calls are active; and
   means for notifying the mobile station with information indicating the presence of the group communication call based on the examination and information enabling the mobile station to participate in the group communication.

10. A method for supporting communication in a group communication system comprising one or more control stations, one or more base stations connected to the control station via a wire line or a wireless line, and a plurality of mobile stations connected to the base stations via wireless lines, the method comprising:
   receiving a location registration signal including a group communication number from a mobile station, the group communication number being an identification number for a group communication made up of a group of mobile stations from among said plurality of mobile stations;
   determining whether a group communication call corresponding to the received group communication number is active based on a group number controlling register that identifies which group communication calls are active; and
   notifying the mobile station that the group communication call corresponding to the received group communication number is active based upon the determination.

11. A method according to claim 10, further comprising maintaining the group number controlling register that identifies which group communication calls are active at a control station.

12. A method according to claim 10, wherein the notification received by the mobile station includes information enabling the mobile station to participate in the group communication through a calling procedure based on the group number either automatically or through operation by a user of the mobile station.

13. A method according to claim 10, wherein the location registration signal with the group communication number are received from the mobile station after the mobile station is powered on.

14. A method according to claim 10, wherein the location registration signal with the group communication number are received from the mobile station after the mobile station has entered a group-communication objective wireless zone due to hand-over.

15. A method according to claim 10, wherein the group communication number is arbitrarily selectable by the mobile station.

16. A method according to claim 10, wherein the location registration signal further includes an identification number for the mobile station, the method further comprising confirming whether the mobile station has been registered based on the identification number received from the mobile station and a mobile station controlling register that includes identification numbers of registered mobile stations.

17. A method according to claim 16, further comprising notifying the mobile station of a result of the confirmation.

18. A method according to claim 16, further comprising enabling communication between the mobile station that sent the location registration signal and a different mobile station that is not a member of the group communication of the mobile station that sent the location registration signal.

19. A control station in a group communication system, comprising:
a group number controlling register configured to store information identifying active group communications; and
a control module configured to receive a location registration signal including a group communication number from a mobile station among a plurality of mobile stations, the group communication number being an identification number for a group communication made up of a group of mobile stations from among a plurality of mobile stations, to examine presence or absence of a group communication call of the mobile station based on the group communication number received from the mobile station and the information stored in the group number controlling register, and to notify the mobile station with information indicating the presence of the group communication call based on the examination and information enabling the mobile station to participate in the group communication.

20. A control station according to claim 19, wherein the information enabling the mobile station to participate in the group communication includes information for a calling procedure to participate in the group communication based on the group number, either automatically or through operation by a user of the mobile station.

21. A control station according to claim 19, wherein the location registration signal with the group communication number is received from the mobile station after the mobile station is powered on.

22. A control station according to claim 19, wherein the location registration signal with the group communication number is received from the mobile station after the mobile station has entered a group-communication objective wireless zone due to hand-over.

23. A control station according to claim 19, wherein the group communication number is arbitrarily selectable by the mobile station.

24. A control station according to claim 19, further comprising a mobile station controlling register that includes identification numbers of registered mobile stations,
wherein the location registration signal further includes an identification number for the mobile station, the control module further configured to confirm whether the mobile station has been registered based on the identification number received from the mobile station and the identification numbers in the mobile station controlling register.

25. A control station according to claim 24, wherein the control module is further configured to notify the mobile station of a result of the confirmation.

26. A control station according to claim 24, further comprising a switch module enabling communication between the mobile station that sent the location registration signal and a different mobile station that is not a member of the group communication of the mobile station that sent the location registration signal.

27. A control station according to claim 19, wherein the control module is operatively connected with a control module at each of a plurality of base stations.

28. A control station according to claim 19, wherein the control station carries out central control over a plurality of base stations disposed in different service areas, respectively, to provide a connection between the mobile station belonging to a first group of mobile stations under a first group communication and a different mobile station belonging to a second group of mobile stations under a second group communication different from the first group communication.

* * * * *